United States Patent
Zhang et al.

(10) Patent No.: US 12,556,891 B2
(45) Date of Patent: Feb. 17, 2026

(54) PROCESS SIGNALING SENDING METHOD AND APPARATUS, STORAGE MEDIUM, AND ELECTRONIC DEVICE

(71) Applicant: ZTE Corporation, Shenzhen (CN)

(72) Inventors: Wei Zhang, Shenzhen (CN); Xiaxiang Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 373 days.

(21) Appl. No.: 18/022,597

(22) PCT Filed: Aug. 12, 2021

(86) PCT No.: PCT/CN2021/112367
§ 371 (c)(1),
(2) Date: Feb. 22, 2023

(87) PCT Pub. No.: WO2022/042328
PCT Pub. Date: Mar. 3, 2022

(65) Prior Publication Data
US 2023/0319521 A1    Oct. 5, 2023

(30) Foreign Application Priority Data
Aug. 26, 2020    (CN) .......................... 202010873854.6

(51) Int. Cl.
*H04W 24/02*    (2009.01)
*H04W 4/20*    (2018.01)

(52) U.S. Cl.
CPC ............. *H04W 4/20* (2013.01); *H04W 24/02* (2013.01)

(58) Field of Classification Search
CPC ....... H04L 5/001; H04L 5/0098; H04L 69/28; H04L 69/40; H04W 4/20; H04W 24/02;
(Continued)

(56) References Cited

U.S. PATENT DOCUMENTS 12,022,330 B2 *    6/2024    Futaki ..................... H04L 5/001
12,075,492 B2 *    8/2024    He ....................... H04W 74/004
(Continued)

FOREIGN PATENT DOCUMENTS

CN    103152757 A    6/2013
CN    206341224 U    7/2017
(Continued)

OTHER PUBLICATIONS

ZTE, Discussion on SCell management in CU-DU deployment, 3GPP TSG RAN WG3#99 Meeting Athens, Greece, R3-180899, Feb. 26 to Mar. 2, 2018.*

(Continued)

*Primary Examiner* — Frank Duong
(74) *Attorney, Agent, or Firm* — CANTOR COLBURN LLP (57) ABSTRACT

The embodiments of the present disclosure provide a process signaling sending method and apparatus, a storage medium, and an electronic device. The method includes: sending first process signaling to a first unit, wherein the first process signaling is used for instructing the first unit to execute a first to-be-executed task; and sending, in a case where a first response message for the first process signaling is not received, second process signaling to the first unit, wherein the second process signaling is used for instructing the first unit to execute a second to-be-executed task, and a priority of the second to-be-executed task is higher than a priority of the first second to-be-executed task.

16 Claims, 7 Drawing Sheets

(58) Field of Classification Search
CPC ... H04W 76/15; H04W 88/08; H04W 88/085; H04W 92/12; H04W 92/24
See application file for complete search history.

(56) References Cited

U.S. PATENT DOCUMENTS

| | | | |
|---|---|---|---|
| 2014/0043969 A1 | 2/2014 | Xu | |
| 2020/0267537 A1 | 8/2020 | Oak et al. | |
| 2021/0051642 A1* | 2/2021 | Han | H04W 36/30 |
| 2021/0168758 A1* | 6/2021 | Luo | H04W 76/15 |
| 2022/0369174 A1* | 11/2022 | Centonza | H04W 76/19 |
| 2023/0067432 A1* | 3/2023 | Wang | G06F 9/4843 |
| 2023/0305681 A1* | 9/2023 | Liu | H04M 1/72469 |

FOREIGN PATENT DOCUMENTS

| | | |
|---|---|---|
| CN | 108601015 A | 9/2018 |
| EP | 3280212 A1 | 2/2018 |
| WO | 2013042908 A1 | 3/2013 |
| WO | 2018175809 A1 | 9/2018 |
| WO | 2019195563 A1 | 10/2019 |
| WO | 2020164035 A1 | 8/2020 |

OTHER PUBLICATIONS

International Search Report for corresponding application PCT/CN2021/112367 filed Aug. 12, 2021; Mail date Nov. 11, 2021.
European Search Report for corresponding application EP21860167, Report dated Jan. 23, 2024.

* cited by examiner

PROCESS SIGNALING SENDING METHOD AND APPARATUS, STORAGE MEDIUM, AND ELECTRONIC DEVICE

CROSS-REFERENCE TO RELATED APPLICATION

The present disclosure is a National Stage Filing of the PCT International Application No. PCT/CN2021/112367 filed on Aug. 12, 2021, which claims priority to Chinese patent application No. CN202010873854.6, entitled "PROCESS SIGNALING SENDING METHOD AND APPARATUS, STORAGE MEDIUM, AND ELECTRONIC DEVICE", filed on Aug. 26, 2020, the entire contents of which are incorporated herein by reference.

TECHNICAL FIELD

The embodiment of the present disclosure relates to the field of communication, in particular to a process signaling sending method and apparatus, a storage medium, and an electronic device.

BACKGROUND

A 5th Generation (5G) technology for mobile communication has been applied in life of people. A 3rd Generation partnership project (3GPP) has agreed on a system architecture where a Centralized Unit (CU) and a Distributed Unit (DU) of a 5G Radio Access Network (RAN) are separated. An interface between the CU and the DU, namely an F1 interface, is mainly responsible for transmission of signaling and data between the CU and the DU. Along with development of service requirements and technical demands, there will be an increasing number of more and more complicated scenarios and events for the CU/DU. The events are different in priority. For dealing with complicated problems such as concurrent scenarios and abnormal scenarios of various services, the F1 interface needs to timely and accurately transmit a latest state or a high-priority control command of the CU/DU, for example, the F1 interface needs to interrupt a current signaling process or immediately execute higher-priority signaling.

In design of a current 3GPP F1 interface, when one of the CU/DU initiates a signaling process, but cannot timely inform a peer side of a latest state or a control command, the side initiating the signaling process has to wait for a signaling response from the peer side before it can continue processing, and therefore a time delay requirement of a system cannot be met. Even under an extreme situation, there will be serious consequences such UE being offline due to untimely response.

Related technologies have not provided effective solutions for signaling process executing problems in the related art.

SUMMARY

The embodiments of the present disclosure provide a process signaling sending method and apparatus, a storage medium, and an electronic device, which may at least solve a problem about signaling process execution in related technologies.

According to an embodiment of the present disclosure, a process signaling sending method is provided, and includes: sending first process signaling to a first unit, wherein the first process signaling is used for instructing the first unit to execute a first to-be-executed task; and sending, in a case where a first response message for the first process signaling is not received, second process signaling to the first unit, wherein the second process signaling is used for instructing the first unit to execute a second to-be-executed task, and a priority of the second to-be-executed task is higher than a priority of the first second to-be-executed task.

According to an embodiment of the present disclosure, a process signaling receiving method is provided, and includes: receiving first process signaling sent by a second unit, wherein the first process signaling is used for instructing a first unit to execute a first to-be-executed task; and receiving, in a case where a first response message for the first process signaling is not sent to the second unit, second process signaling sent by the second unit, wherein the second process signaling is used for instructing the first unit to execute a second to-be-executed task, and a priority of the second to-be-executed task is higher than a priority of the first second to-be-executed task.

According to an embodiment of the present disclosure, a process signaling sending apparatus is provided, and includes: a first sending module, configured to send first process signaling to a first unit, wherein the first process signaling is used for instructing the first unit to execute a first to-be-executed task; and a second sending module, configured to send, in a case where a first response message for the first process signaling is not received, second process signaling to the first unit, wherein the second process signaling is used for instructing the first unit to execute a second to-be-executed task, and a priority of the second to-be-executed task is higher than a priority of the first second to-be-executed task.

In an exemplary embodiment, the above apparatus may further include: a first determine module, configured to determine the second process signaling before the second process signaling is sent to the first unit in the case where the first response message for the first process signaling is not received, wherein the second process signaling includes a preset information element, and the preset information element includes the second to-be-executed task and is used for instructing the first unit to execute the second to-be-executed task first.

In an exemplary embodiment, the above first determine module includes a first determine unit configured to add the preset information element in an interface message between the first unit and a second unit to obtain the second process signaling.

In an exemplary embodiment, the above apparatus may further include: a third receiver module, configured to receive a measurement report sent by user equipment after the first process signaling is sent to the first unit, wherein the measurement report is used for indicating that a secondary cell to which the user equipment is accessed is in an abnormal state; and a second determine module, configured to determine the second process signaling based on the measurement report.

In an exemplary embodiment, the above apparatus may further include: a fourth receiver module, configured to receive a reconfiguration process sent by a Long Term Evolution (LTE) system after the first process signaling is sent to the first unit, wherein the reconfiguration process is used for indicating that configuration of a base station is in a to-be-modified state; and a third determine module, configured to determine the second process signaling based on the reconfiguration process.

In an exemplary embodiment, the above apparatus may further include: a fifth receiver module, configured to receive a second response message, sent by the first unit, for the second to-be-executed task after the second process signaling is sent to the first unit in the case where the first response message for the first process signaling is not received, wherein the second response message is used for indicating that the first unit has executed the second to-be-executed task.

In an exemplary embodiment, the above apparatus may further include: a sixth receiver module, configured to receive the first response message sent by the first unit after the second response message, sent by the first unit, for the second to-be-executed task is received, wherein the first response message is used for indicating that the first unit has executed the first to-be-executed task.

According to an embodiment of the present disclosure, a process signaling receiving apparatus is provided, and includes a first receiver module, configured to receive first process signaling sent by a second unit, wherein the first process signaling is used for instructing a first unit to execute a first to-be-executed task; and a second receiver module, configured to receive, in a case where a first response message for the first process signaling is not sent to the second unit, second process signaling sent by the second unit, wherein the second process signaling is used for instructing the first unit to execute a second to-be-executed task, and a priority of the second to-be-executed task is higher than a priority of the first second to-be-executed task.

In an exemplary embodiment, the above apparatus may further include: a fourth determine module, configured to execute the second to-be-executed task to obtain the second response message after the second process signaling sent by the second unit is received in the case where the first response message for the first process signaling is not sent to the second unit; and a third sending module, configured to send the second response message to the second unit.

In an exemplary embodiment, the above apparatus may further include: a fifth determine module, configured to execute the first to-be-executed task to obtain the first response message after the second response message is sent to the second unit; and a fourth sending module, configured to send the first response message to the second unit.

According to another embodiment of the present disclosure, a computer-readable storage medium storing computer programs is further provided, wherein the computer programs are configured to execute operations in any above method embodiment at runtime.

According to another embodiment of the present disclosure, an electronic device including a memory and a processor is further provided, wherein the memory stores computer programs, and the processor is configured to run the computer programs so as to execute operations in any above method embodiment.

DETAILED DESCRIPTION OF THE EMBODIMENTS

Embodiments of the present disclosure are described in detail in reference to drawings and in combination with embodiments as below.

It needs to be noted that terms such as "first" and "second" of the description, the claims and the above drawings of the embodiments of the present disclosure are used for distinguishing similar objects but are unnecessarily used for describing specific sequences or precedence orders.

Figure 1:
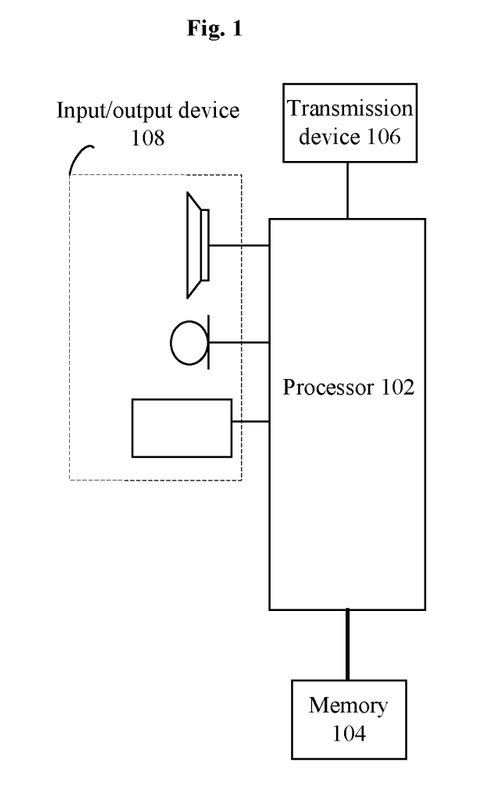
FIG. 1 is a hardware structure diagram of a mobile terminal for implementing a process signaling sending method according to the embodiments of the present disclosure.

The method embodiments provided by the embodiments of the present application may be performed in a mobile terminal, a computer terminal or similar arithmetic units. Taking operation on the mobile terminal as an example, FIG. 1 is a hardware structure diagram of a mobile terminal for implementing a process signaling sending method according to the embodiments of the present disclosure. As shown in FIG. 1, the mobile terminal may include one or more (only one is shown in FIG. 1) processors 102 (the processor 102 may include but not limited to a Micro Control Unit (MCU) or a Field Programmable Gate Array (FPGA) or other processing units) and a memory 104 configured to store data, wherein the mobile terminal may include a transmission device 106 with a communication function and an input/output device 108. Those of ordinary skill in the art can understand that a structure shown in FIG. 1 is only schematic and does not limit a structure of the above mobile terminal. For example, the mobile terminal may further include more or fewer components than those in FIG. 1, or may have configurations different from those shown in FIG. 1.

The memory 104 may be configured to store computer programs such as software programs and modules of application software, such as computer programs corresponding to the process signaling sending method in the embodiment of the present disclosure. The processor 102 performs various functional applications and data processing by operating the computer programs stored in the memory 104, thereby realizing the above method. The memory 104 may include a high-speed random access memory and may further include a nonvolatile memory, such as one or more magnetic memories, flash memories or other nonvolatile solid state memories. In some examples, the memory 104 may further include memories which are remotely set relative to the processor 102, and the remote memories can be connected to the mobile terminal through networks. The examples of the above networks include but not limited to an Internet, an intranet, a local area network, a mobile communication network and a combination thereof.

The transmission device 106 is configured to receive or send data through one network. A specific example of the above networks may include a wireless network provided by a communication supplier of the mobile terminal. In one example, the transmission device 106 includes a Network Interface Controller (NIC) which can be connected to other network devices through a base station so as to communicate with the internet. In one example, the transmission device 106 may be a Radio Frequency (RF) module configured to communicate with the internet in a wireless manner.

Figure 2:
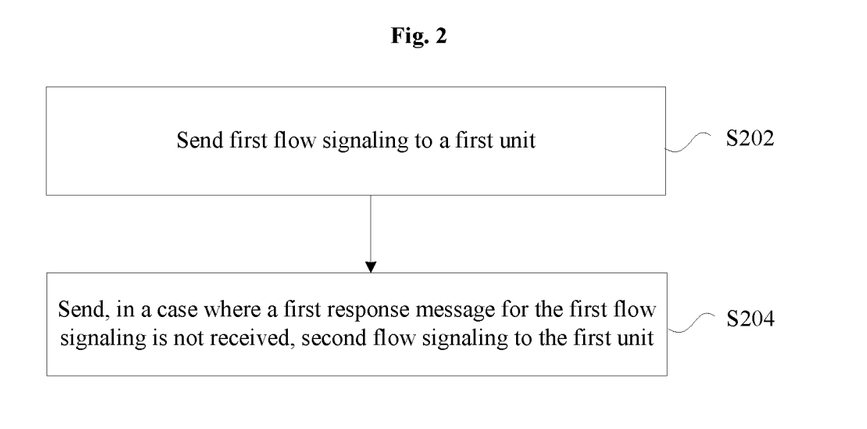
FIG. 2 is a flowchart of a process signaling sending method according to the embodiments of the present disclosure.

The embodiments provide a process signaling sending method. FIG. 2 is a flowchart of a process signaling sending method according to the embodiments of the present disclosure. As shown in FIG. 2, the process includes following operations.

At S202, first process signaling is sent to a first unit, wherein the first process signaling is used for instructing the first unit to execute a first to-be-executed task.

At S204, in a case where a first response message for the first process signaling is not received, second process signaling is sent to the first unit, wherein the second process signaling is used for instructing the first unit to execute a second to-be-executed task, and a priority of the second to-be-executed task is higher than a priority of the first second to-be-executed task.

Figure 3:
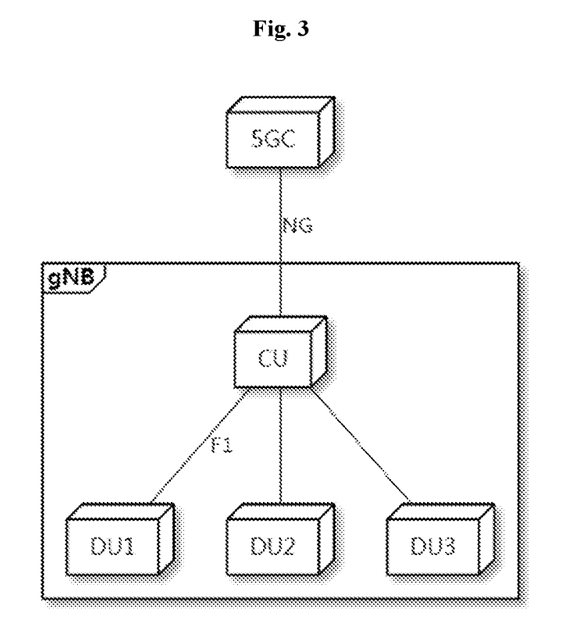
FIG. 3 is a diagram of 5G RAN system architecture according to the embodiments of the present disclosure.

In the embodiments, the first unit includes but is not limited to a CU, and the second unit includes but is not limited to a DU. It needs to be noted that process signaling may be transmitted between the first unit and the second unit. As shown in FIG. 3, each base station (for example, gNB) has a plurality of DUs subjected to centralized management through the same CU. The interfaces, namely F1 interfaces between the CU and the DUs mainly complete transmission of signaling and data between the CU and the DUs.

In the embodiments, before any one of CU/DU initiates a process and receives a response message from the peer side and when the process initiator needs to initiate a new process, the peer side is informed through the second process signaling. The receiver recognizes, according to the second process signaling, the process needing to be executed. The F1 interface signaling includes both User Equipment (UE)-process associated signaling and non-UE-process associated signaling. Control signaling needs to be timely updated due to some reasons no matter which signaling process is initiated by any one of CU/DU. That is, the technical solution is applicable to all F1 interface signaling process. When current signaling process needs to be timely adjusted due to some abnormal situations in the CU and the DUs, response can be rapidly made, signaling process with a higher priority is timely executed, and thus system timeliness is greatly improved.

An executive entity of the above operations may be, but is not limited to, the second unit.

By means of the above operations, the first process signaling is sent to the first unit, wherein the first process signaling is used for instructing the first unit to execute the first to-be-executed task; the second process signaling is sent to the first unit in a case where a first response message for the first process signaling is not received, wherein the second process signaling is used for instructing the first unit to execute the second to-be-executed task, and a priority of the second to-be-executed task is higher than a priority of the first second to-be-executed task. By virtue of the solution, the high-priority control command can be timely executed, which meets a time delay requirement of a system. Thus, a problem about signaling process execution can be solved, and an effect of timely processing a control process is achieved.

In an exemplary embodiment, before sending the second process signaling to the first unit in a case where the first response message for the first process signaling is not received, the method may further include the following operation.

At S1, the second process signaling is determined, wherein the second process signaling includes a preset information element, and the preset information element includes a second to-be-executed task and is used for instructing the first unit to execute the second to-be-executed task first.

In the embodiments, in the F1 interfaces, the preset information element is added in the first process signaling to obtain the second process signaling, which indicates that the signaling process needs to be timely adjusted or updated, and the second to-be-executed task includes but is not limited to incremental updating, process interruption, process roll-back, etc.

In the F1 interfaces, the newly-generated second process signaling indicates the signaling process needing to be timely updated or executed, and the process includes but is not limited to incremental updating, process interruption, process roll-back, etc.

In an exemplary embodiment, determining second process signaling includes the following operation.

At S1, the preset information element is added in an interface message between the first unit and the second unit to obtain the second process signaling. For example, the preset information element is added in an F1 interface message between the CU and the DU.

In an exemplary embodiment, after sending the first process signaling to the first unit, the method may further include the following operations.

At S1, a measurement report sent by user equipment is received, wherein the measurement report is used for indicating that a secondary cell to which the user equipment is accessed is in an abnormal state.

At S2, the second process signaling is determined based on the measurement report.

In the embodiments, the secondary cell to which the user equipment is accessed being in the abnormal state includes, but is not limited to, that the cell quality of the scell of the UE becomes poor and the UE reports an A2 measurement report to the CU.

In an exemplary embodiment, after sending the first process signaling to the first unit, the method may further include the following operations.

At S1, a reconfiguration process sent by a Long Term Evolution (LTE) system is received, wherein the reconfiguration process is used for indicating that configuration of a base station is in a to-be-modified state.

At S2, the second process signaling is determined based on the reconfiguration process.

In an exemplary embodiment, after sending the second process signaling to the first unit in the case where the first response message for the first process signaling is not received, the method may further include the following operations.

At S1, a second response message, sent by the first unit, for the second to-be-executed task is received, wherein the second response message is used for indicating that the first unit has executed the second to-be-executed task.

In the embodiments, the first unit executes the second to-be-executed task first, and then executes the first to-be-executed task.

In an exemplary embodiment, after receiving the second response message, sent by the first unit, for the second to-be-executed task, the method may further include the following operation.

At S1, the first response message sent by the first unit is received, wherein the first response message is used for indicating that the first unit has executed the first to-be-executed task.

Figure 4:
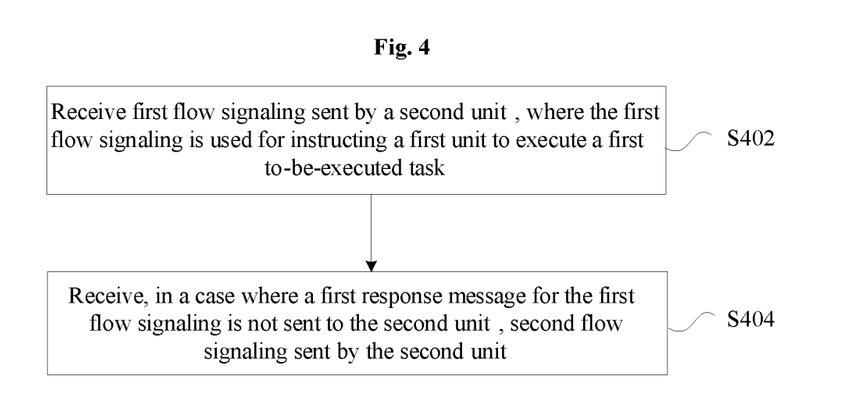
FIG. 4 is a flowchart of a process signaling receiving method according to the embodiments of the present disclosure.

The embodiments provide a process signaling receiving method. FIG. 4 is a flowchart of a process signaling receiving method according to the embodiments of the present disclosure. As shown in FIG. 4, the process includes the following operations.

At S402, first process signaling sent by a second unit is received, wherein the first process signaling is used for instructing a first unit to execute a first to-be-executed task.

At S404, in a case where a first response message for the first process signaling is not sent to the second unit, second process signaling sent by the second unit is received, wherein the second process signaling is used for instructing the first unit to execute a second to-be-executed task, and a priority of the second to-be-executed task is higher than a priority of the first second to-be-executed task.

In the embodiments, the first unit includes but is not limited to a CU, and the second unit includes but is not limited to a DU. It needs to be noted that process signaling may be transmitted between the first unit and the second unit. As shown in FIG. 3, each base station (for example, gNB) has a plurality of DUs subjected to centralized management through the same CU. The interfaces, namely F1 interfaces between the CU and the DUs mainly complete transmission of signaling and data between the CU and the DUs.

In the embodiments, before any one of CU/DU initiates a process and receives a response message from the peer side and when the process initiator needs to initiate a new process, the peer side is informed through the second process signaling. The receiver recognizes, according to the second process signaling, the process needing to be executed. The F1 interface signaling includes both User Equipment (UE)-process associated signaling and non-UE-process associated signaling. Control signaling needs to be timely updated due to some reasons no matter which signaling process is initiated by any one of CU/DU. That is, the technical solution is applicable to all F1 interface signaling process. When current signaling process needs to be timely adjusted due to some abnormal situations in the CU and the DUs, response can be rapidly made, signaling process with a higher priority is timely executed, and thus system timeliness is greatly improved.

An executive entity of the above operations may be, but is not limited to, the first unit.

By means of the above operations, the first process signaling sent by the second unit is received, wherein the first process signaling is used for instructing the first unit to execute the first to-be-executed task; and in a case where a first response message for the first process signaling is not sent to the second unit, the second process signaling sent by the second unit is received, wherein the second process signaling is used for instructing the first unit to execute the second to-be-executed task, and a priority of the second to-be-executed task is higher than a priority of the first second to-be-executed task. By virtue of the solution, the high-priority control command can be timely executed, which meets a time delay requirement of a system. Thus, a problem about signaling process execution can be solved, and an effect of timely processing a control process is achieved.

In an exemplary embodiment, after receiving the second process signaling sent by the second unit in the case where the first response message for the first process signaling is not sent to the second unit, the method may further include the following operations.

At S1, the second to-be-executed task is executed to obtain the second response message.

At S2, the second response message is sent to the second unit.

In an exemplary embodiment, after sending the second response message to the second unit, the method may further include the following operations.

At S1, the first to-be-executed task is executed to obtain the first response message.

At S2, the first response message is sent to the second unit.

The present disclosure is further described in combination with exemplary embodiments as below.

In the exemplary embodiments, a description is made with a UE Context Modification Request process initiated by the CU in the F1 interface as an example, and in such case the DU is commonly required to reply to the CU with a message of UE Context Modification Response/UE Context Modification Failure.

Exemplary Embodiment 1, in which a high-priority process is executed first.

Figure 5:
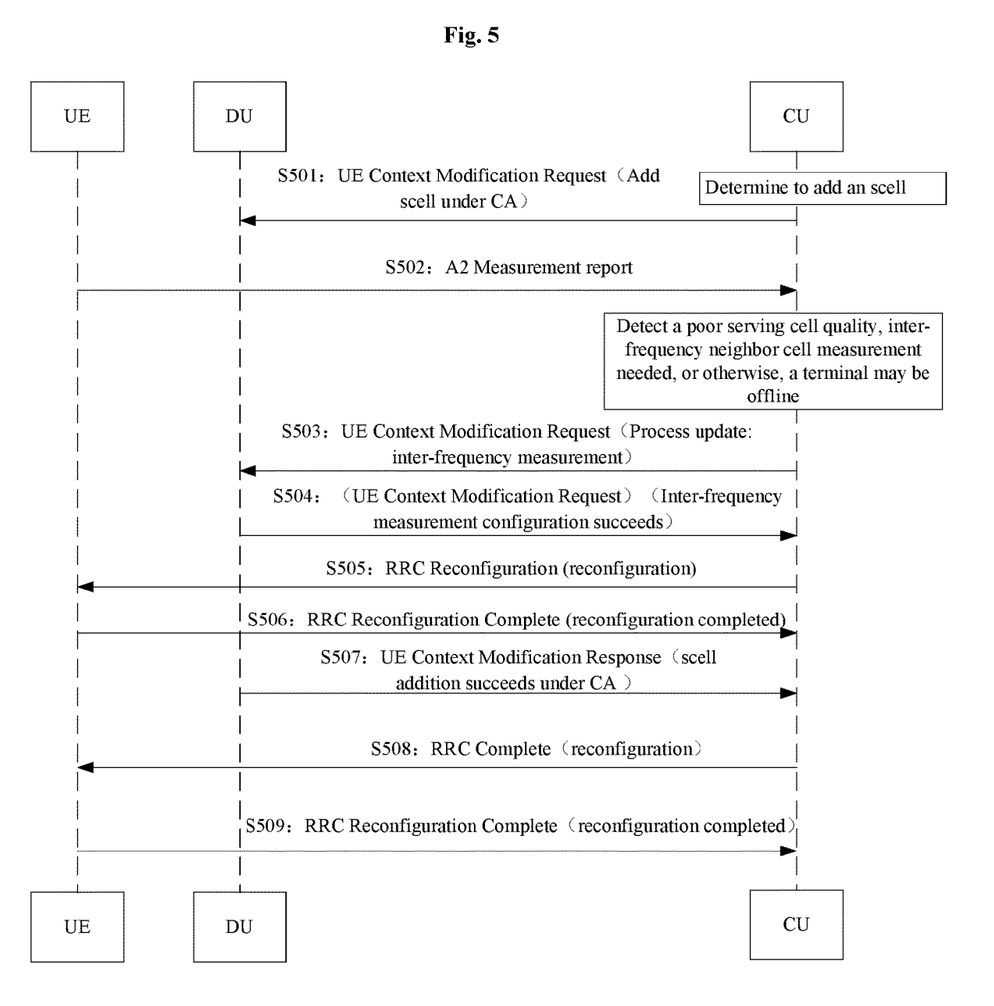
FIG. 5 is a flowchart of preferable execution of a high priority according to an embodiment of the present disclosure.

As shown in FIG. 5, the exemplary embodiment includes the following operations.

At S501, a CU sends a UE Context Modification Request (corresponding to the first process signaling above) message to a DU, wherein the UE Context Modification Request message carries a new scell needing to be added.

Contents of the UE Context Modification Request message are shown in Table 1:

TABLE 1

| Information Element | Value | |
|---|---|---|
| Message Type | | |
| | >Procedure Code | UE Context Modification Request |
| | >Type of Message | Initiating Message |
| gNB-CU UE F1AP ID | INTEGER (0 . . . 232-1) | CU-side UE Instance ID |
| gNB-DU UE F1AP ID | INTEGER (0 . . . 232-1) | DU-side UE Instance ID |
| Scell To Be Setup List | | To-be-added scell |
| Other Information Elements | | Filled As Required |

At S502, UE reports an A2 measurement report when a quality of a scell of the UE becomes poor.

At S503, the CU determines that it is needed to issue inter-frequency neighbor cell measurement, and since a scell adding process is already ongoing at present, the CU informs the DU of an update process by a newly added information element "Process Update".

Message contents are shown in Table 2:

TABLE 2

| Information Element | Value | |
|---|---|---|
| Message Type | | |
| | >Procedure Code | UE Context Modification Request |
| | >Type of Message | Initiating Message |
| gNB-CU UE F1AP ID | INTEGER (0 . . . 232-1) | CU-side UE Instance ID |
| gNB-DU UE F1AP ID | INTEGER (0 . . . 232-1) | DU-side UE Instance ID |
| New Information Element Process Update | ENUMERATED UpdateMeasConfig, stop . . . | Update Meas Config |
| Other Information Elements | | Filled As Required |

At S504, the DU determines to immediately update measurement configuration, and informs the CU of successful updating after corresponding processes are executed.

At S505, the CU informs the UE that a new inter-frequency measurement takes effect.

At S506, the UE informs the CU of successful inter-frequency measurement configuration.

At S507, the DU informs the CU of successful scell adding.

At S508, the CU informs the UE that the new scell takes effect.

At S509, the UE informs the CU of successful scell configuration and the process ends.

Exemplary Embodiment 2

Figure 6:
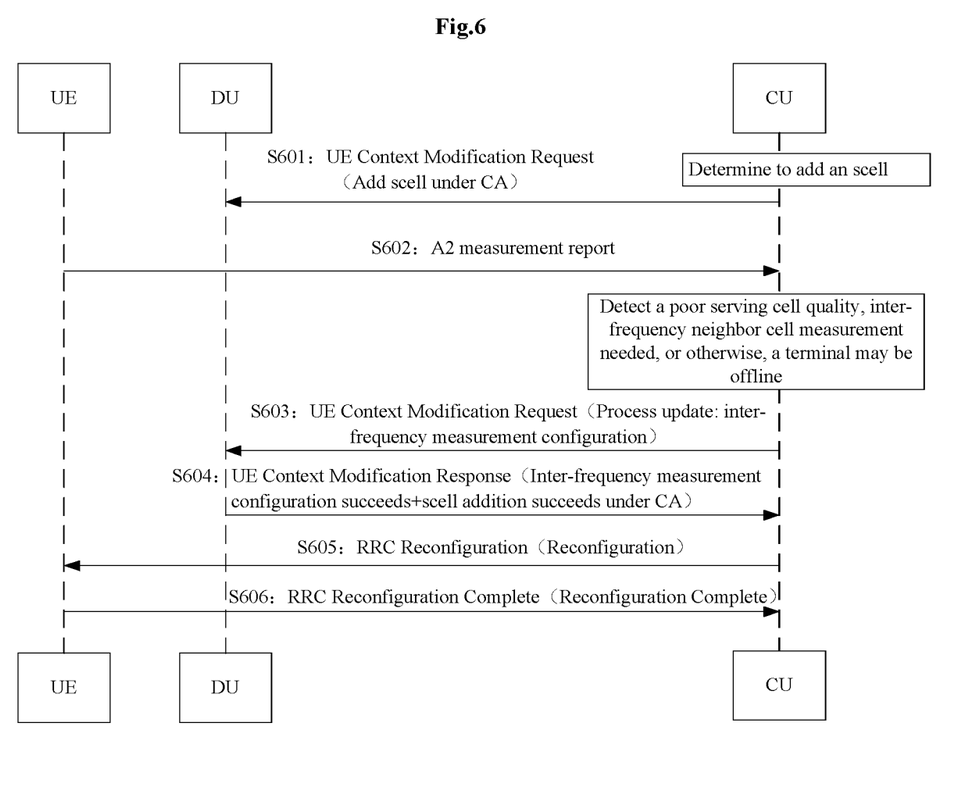
FIG. 6 is a flowchart under a combination of responses for a high-priority process and a low-priority process according to an embodiment of the present disclosure.

FIG. 6 is a flowchart under a combination of responses for a high-priority process and a low-priority process according to the embodiment. The flow includes the following operations.

At S601, a CU sends a UE Context Modification Request message to a DU, wherein the UE Context Modification Request message carries a scell needing to be added.

Message contents are shown in Table 3:

TABLE 3

| Information Element | Value | |
|---|---|---|
| Message Type | | |
| | >Procedure Code | UE Context Modification Request |
| | >Type of Message | Initiating Message |
| gNB-CU UE F1AP ID | INTEGER (0 . . . 232-1) | CU-side UE Instance ID |
| gNB-DU UE F1AP ID | INTEGER (0 . . . 232-1) | DU-side UE Instance ID |
| SCell To Be Setup List | | To-be-added scell |
| Other Information Elements | | Filled As Required |

At S602, UE reports an A2 measurement report when a quality of a scell of the UE becomes poor.

At S603, the CU determines that it is needed to issue an inter-frequency neighbor cell measurement, and since a scell adding process is already ongoing at present, the CU informs the DU of an update process by a newly added information element "Process Update".

Message contents are shown in Table 4:

TABLE 4

| Information Element | Value | |
|---|---|---|
| Message Type | | |
| | >Procedure Code | UE Context Modification Request |
| | >Type of Message | Initiating Message |
| gNB-CU UE F1AP ID | INTEGER (0 . . . 232-1) | CU-side UE Instance ID |
| gNB-DU UE F1AP ID | INTEGER (0 . . . 232-1) | DU-side UE Instance ID |
| New Information Element Process Update | ENUMERATED UpdateMeasConfig, stop . . . | updateMeasConfig |
| Other Information Elements | | Filled As Required |

At S604, the DU determines to immediately update measurement configuration, continues to execute the scell adding process after corresponding processes are executed, and informs the CU of successful updating after the processes all succeed.

At S605, the CU informs the UE that a new inter-frequency measurement takes effect and informs the UE to add the scell.

At S606, the UE informs the CU of successful inter-frequency measurement configuration, and the process ends after successful scell adding.

Exemplary Embodiment 3

Figure 7:
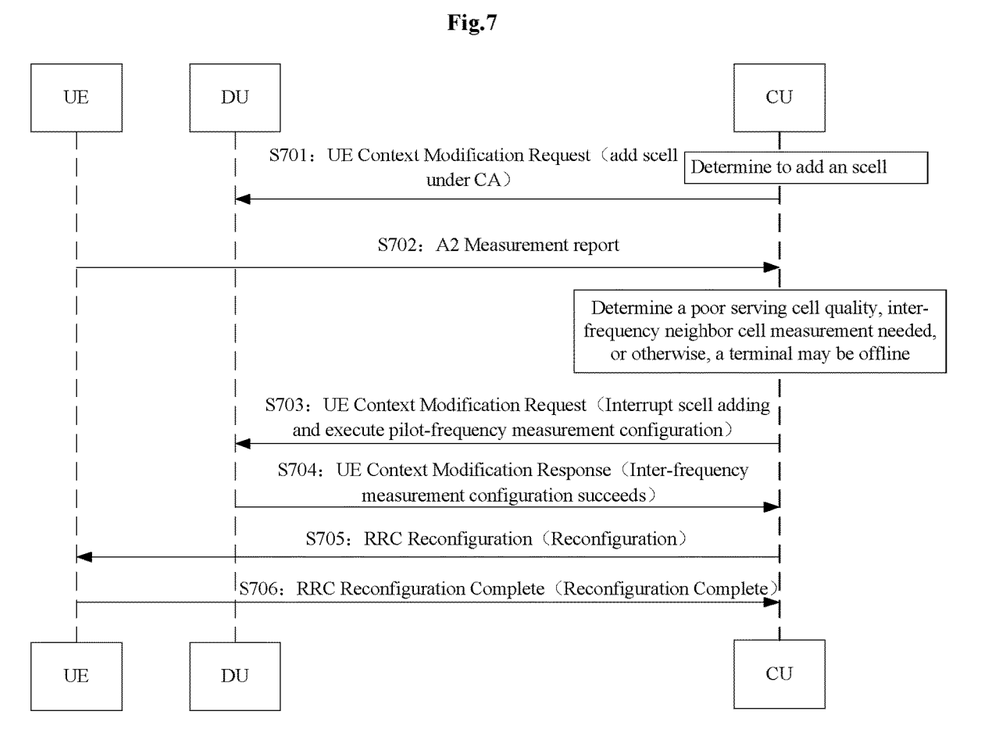
FIG. 7 is a flowchart of interrupting a low priority according to an embodiment of the present disclosure.

FIG. 7 is a flowchart of interrupting a low priority in the embodiment. The flow includes following operations.

At S701, a CU sends a UE Context Modification Request message to a DU, wherein the UE Context Modification Request message carries a scell needing to be added.

Message contents are shown in Table 5:

TABLE 5

| Information Element | Value | |
|---|---|---|
| Message Type | | |
| | >Procedure Code | UE Context Modification Request |
| | >Type of Message | Initiating Message |
| gNB-CU UE F1AP ID | INTEGER (0 . . . 232-1) | CU-side UE Instance ID |
| gNB-DU UE F1AP ID | INTEGER (0 . . . 232-1) | DU-side UE Instance ID |
| SCell To Be Setup List | | To-be-added scell |
| Other Information Elements | | Filled As Required |

At S702, UE reports an A2 measurement report when a quality of a scell of the UE becomes poor.

At S703, the CU determines that it is needed to issue an inter-frequency neighbor cell measurement, and since a scell adding process is already ongoing at present, the CU informs, by a newly added information element "Process Update", the DU to interrupt the scell adding process and execute an inter-frequency measurement configuration process.

Message contents are shown in Table 6:

TABLE 6

| Information Element | | Value |
|---|---|---|
| Message Type | | |
| | >Procedure Code | UE Context Process Update Request |
| | >Type of Message | Initiating Message |
| gNB-CU UE F1AP ID | INTEGER (0 . . . 232-1) | CU-side UE Instance ID |
| gNB-DU UE F1AP ID | INTEGER (0 . . . 232-1) | DU-side UE Instance ID |
| New Information Element Process Update | ENUMERATED updateMeasConfig, stop . . . | Stop a previous low-priority process |
| Other Information Elements | | Filled As Required |

At S704, the DU determines to immediately interrupt the current scell adding process and update measurement configuration. After the DU executes corresponding processes, the CU is informed of successful updating through UE Context Modification Response signaling.

At S705, the CU informs the UE that a new inter-frequency measurement takes effect.

At S706, the UE informs the CU of successful inter-frequency measurement configuration and the process ends.

Exemplary Embodiment 5

Figure 8:
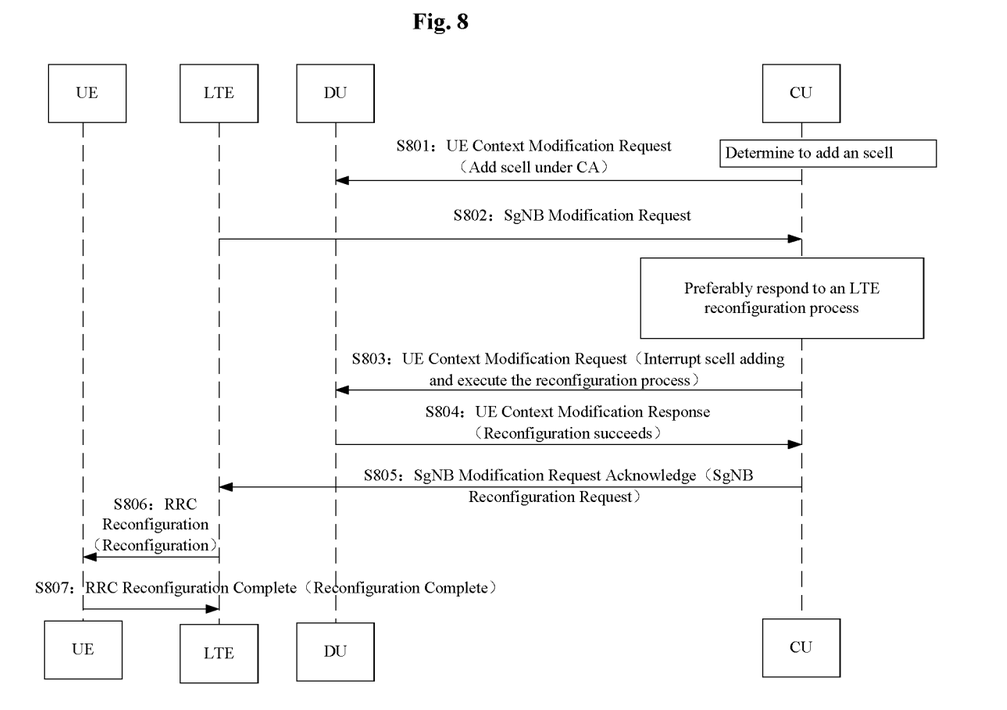
FIG. 8 is a flowchart of interrupting a low priority under non-standalone (NSA) according to an embodiment of the present disclosure.

FIG. 8 is flowchart of interrupting a low priority under NSA. The flow includes the following operations.

At S801, a CU sends a UE Context Modification Request message to a DU, wherein the UE Context Modification Request message carries a scell needing to be added.

Message contents are shown in Table 7:

TABLE 7

| Information Element | | Value |
|---|---|---|
| Message Type | | |
| | >Procedure Code | UE Context Modification Request |
| | >Type of Message | Initiating Message |
| gNB-CU UE F1AP ID | INTEGER (0) . . . 232-1) | CU-side UE Instance ID |
| gNB-DU UE F1AP ID | INTEGER (0 . . . 232-1) | DU-side UE Instance ID |
| SCell To Be Setup List | | To-be-added scell |
| Other Information Elements | | Filled As Required |

At S802, an LTE initiates a context modification reconfiguration process to modify configuration of gNB.

At S803, the CU determines to first process the LTE reconfiguration process, and since a scell adding process is already ongoing at present, the CU informs, by a newly added information element "Process Update", the DU to interrupt the scell adding process and execute a reconfiguration process.

Message contents are shown in Table 8:

TABLE 8

| Information Element | | Value |
|---|---|---|
| Message Type | | |
| | >Procedure Code | UE Context Modification Request |
| | >Type of Message | Initiating Message |
| gNB-CU UE F1AP ID | INTEGER (0 . . . 232-1) | CU-side UE Instance ID |
| gNB-DU UE F1AP ID | INTEGER (0 . . . 232-1) | DU-side UE Instance ID |
| New Information Element Process Update | ENUMERATED updateMeasConfig, stop . . . | Stop a previous low-priority process |
| Other Information Elements | | Filled As Required |

At S804, the DU determines to immediately interrupt the current scell adding process and update configuration. After the DU executes corresponding processes, the CU is informed of successful updating through UE Context Modification Response signaling.

At S805, the CU informs the LTE of successful context modification reconfiguration process.

At S806, the LTE informs the UE to reconfigure a wireless parameter.

At S807, the UE informs the LTE of successful wireless parameter reconfiguration and the process ends.

By describing the above implementation modes, those skilled in the art can clearly know that the method according to the above embodiments can be realized by means of software and necessary universal hardware platforms and also can be realized through the hardware, but the former is the better implementation mode under many situations. Based on the understanding, the technical solutions of the present disclosure essentially or parts making contribution to the related art can be embodied in the form of a software product, and the computer software product is stored in a storage medium (e.g., a ROM/RAM, a magnetic disk and a light disk) and includes a plurality of instructions to enable a terminal device (e.g., a mobile phone, a computer, a server and a network device) to execute the method in the embodiments of the present disclosure.

The embodiments further provide a process signaling sending apparatus used for achieving the above embodiments and the exemplary implementation which have been explained and are not repeated. The term "module" used as below can realize combination of software and/or hardware with preset functions. Apparatuses described by the following embodiments are preferably realized by the software, but it is possible and conceivable for realizing the apparatuses through the hardware or combination of the software and the hardware.

Figure 9:
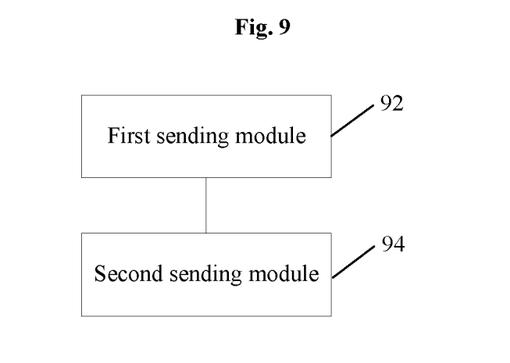
FIG. 9 is a structure diagram of a process signaling sending apparatus according to the embodiments of the present disclosure.

FIG. 9 is a structure diagram of a process signaling sending apparatus according to the embodiments of the present disclosure. As shown in FIG. 9, the apparatus includes:

a first sending module 92, configured to send first process signaling to a first unit, wherein the first process signaling is used for instructing the first unit to execute a first to-be-executed task; and a second sending module 94, configured to send, in a case where a first response message for the first process signaling is not received, second process signaling to the first unit, wherein the second process signaling is used for instructing the first unit to execute a second to-be-executed task, and a priority of the second to-be-executed task is higher than a priority of the first second to-be-executed task.

In an exemplary embodiment, the above apparatus may further include: a first determine module, configured to determine the second process signaling before the second process signaling is sent to the first unit in the case where the first response message for the first process signaling is not received, wherein the second process signaling includes a preset information element, and the preset information element includes the second to-be-executed task and is used for instructing the first unit to execute the second to-be-executed task first.

In an exemplary embodiment, the above first determine module includes a first determine unit configured to add the preset information element in an interface message between the first unit and a second unit to obtain the second process signaling.

In an exemplary embodiment, the above apparatus may further include: a third receiver module, configured to receive a measurement report sent by user equipment after the first process signaling is sent to the first unit, wherein the measurement report is used for indicating that a secondary cell to which the user equipment is accessed is in an abnormal state; and a second determine module, configured to determine the second process signaling based on the measurement report.

In an exemplary embodiment, the above apparatus may further include: a fourth receiver module, configured to receive a reconfiguration process sent by an LTE system after the first process signaling is sent to the first unit, wherein the reconfiguration process is used for indicating that configuration of a base station is in a to-be-modified state; and a third determine module, configured to determine the second process signaling based on the reconfiguration process.

In an exemplary embodiment, the above apparatus may further include: a fifth receiver module, configured to receive a second response message, sent by the first unit, for the second to-be-executed task after the second process signaling is sent to the first unit in the case where the first response message for the first process signaling is not received, wherein the second response message is used for indicating that the first unit has executed the second to-be-executed task.

In an exemplary embodiment, the above apparatus may further include: a sixth receiver module, configured to receive the first response message sent by the first unit after the second response message, sent by the first unit, for the second to-be-executed task is received, wherein the first response message is used for indicating that the first unit has executed the first to-be-executed task.

Figure 10:
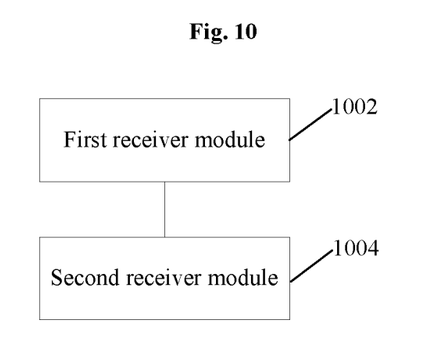
FIG. 10 is a structure diagram of a process signaling receiving apparatus according to the embodiments of the present disclosure.

FIG. 10 is a structure diagram of a process signaling receiving apparatus according to the embodiments of the present disclosure. As shown in FIG. 10, the apparatus includes:

a first receiver module 1002, configured to receive first process signaling sent by a second unit, wherein the first process signaling is used for instructing a first unit to execute a first to-be-executed task; and a second receiver module 1004, configured to receive, in a case where a first response message for the first process signaling is not sent to the second unit, second process signaling sent by the second unit, wherein the second process signaling is used for instructing the first unit to execute a second to-be-executed task, and a priority of the second to-be-executed task is higher than a priority of the first second to-be-executed task.

In an exemplary embodiment, the above apparatus may further include: a fourth determine module, configured to execute the second to-be-executed task to obtain the second response message after the second process signaling sent by the second unit is received in the case where the first response message for the first process signaling is not sent to the second unit; and a third sending module, configured to send the second response message to the second unit.

In an exemplary embodiment, the above apparatus may further include: a fifth determine module, configured to execute the first to-be-executed task to obtain the first response message after the second response message is sent to the second unit; and a fourth sending module, configured to send the first response message to the second unit.

It needs to be noted that the above modules can be realized through software or hardware, and for the latter, the modules can be realized by modes including but not limited to a following mode that the above modules are all located in the same processor; or the above modules are located in different processors correspondingly in the form of any combination.

The embodiments of the present disclosure further provide a computer-readable storage medium storing computer programs, wherein the computer programs are configured to execute operations in any above method embodiment at runtime.

In an exemplary embodiment, the above computer-readable storage medium may include but not limited to a U disk, a Read-Only Memory (ROM), a Random Access Memory (RAM), a mobile hard disk, a magnetic disk or a light disk or other media capable of storing the computer programs.

The embodiments of the present disclosure further provide an electronic device including a memory and a processor, wherein the memory stores computer programs, and the processor is configured to run the computer programs so as to execute operations in above any method embodiment.

Figure 11:
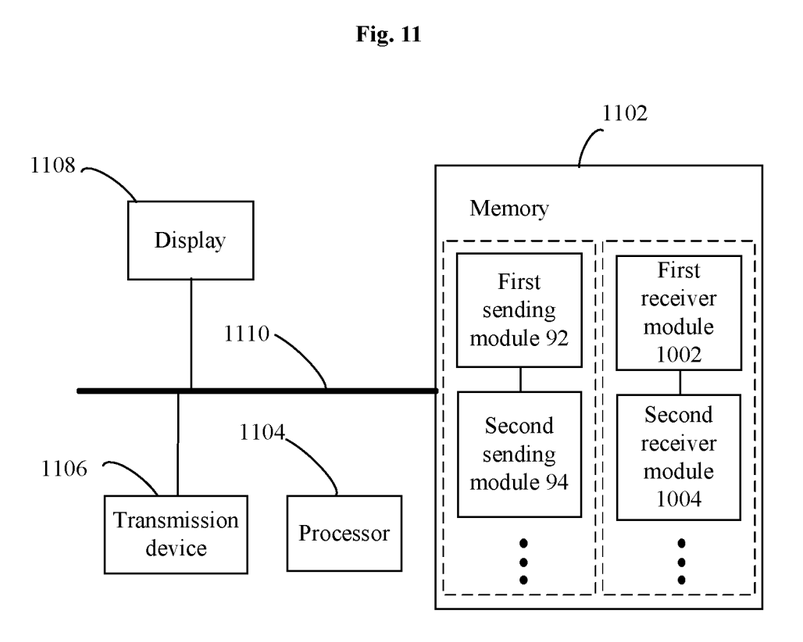
FIG. 11 is a structural schematic diagram of an exemplary electronic device according to the embodiments of the present disclosure.

According to another aspect of the embodiments of the present disclosure, electronic devices for implementing the above process signaling sending method or the process signaling receiving method are further provided, and may be a terminal device or server shown in FIG. 11. In the embodiments, a description is made with an example of the electronic device being the server. As shown in FIG. 11, the electronic device includes a memory 1102 and a processor 1104, wherein the memory 1102 stores computer programs, and the processor 1104 is set to execute, by the computer programs, operations in any above method embodiment.

In the embodiments, the electronic device may be located in at least one of a plurality of network devices in a computer network.

In an exemplary embodiment, the above electronic device may further include a transmission device and an input/output device, wherein the transmission device is connected to the processor, and the input/output device is connected to the processor.

Specific examples in the embodiments may refer to the examples described in the above embodiments and the exemplary implementations, which are not repeated in the embodiments.

Obviously, those skilled in the art should understand that the modules or operations in the embodiments of the present disclosure can be achieved through a universal computing device, can be centralized in a single computing device or distributed in a network formed by multiple computing devices and can be achieved by program codes capable of being executed by the computing device so that the modules or operations can be stored in a storage device to be executed by the computing device. The shown or described operations may be executed in sequence different from the sequence herein under some situations. The modules or operations may be made into various integrated circuit modules, or more of the modules or operations may be made into single integrated circuit modules to be achieved. Thus, the present disclosure is not limited to any specific hardware and software combination.

The above contents are merely exemplary embodiments of the present disclosure without limiting the present disclosure, and the present disclosure can be variously modified and changed for those skilled in the art. Any modification, equivalent replacement, improvement, etc. made within the principle of the present disclosure shall fall within the scope of protection of the present disclosure.

What is claimed is:

1. A process signaling sending method performed by a second unit, comprising:
   sending first process signaling to a first unit, wherein the first process signaling is used for instructing the first unit to execute a first to-be-executed task; and
   sending, in a case where a first response message for the first process signaling is not received, second process signaling to the first unit, wherein the second process signaling is used for instructing the first unit to execute a second to-be-executed task, and a priority of the second to-be-executed task is higher than a priority of the first to-be-executed task,
   wherein after sending, in the case where the first response message for the first process signaling is not received, the second process signaling to the first unit, the method further comprises: receiving a second response message, sent by the first unit, for the second to-be-executed task, wherein the second response message is used for indicating that the first unit has executed the second to-be-executed task; and
   wherein after receiving the second response message, sent by the first unit, for the second to-be-executed task, the method further comprises: receiving the first response message sent by the first unit, wherein the first response message is used for indicating that the first unit has executed the first to-be-executed task.

2. The method according to claim 1, wherein before sending, in the case where the first response message for the first process signaling is not received, the second process signaling to the first unit, the method further comprises:
   determining the second process signaling, wherein the second process signaling comprises a preset information element, and the preset information element comprises the second to-be-executed task and is used for instructing the first unit to execute the second to-be-executed task first.

3. The method according to claim 2, wherein determining the second process signaling comprises:
   adding the preset information element in an interface message between the first unit and the second unit to obtain the second process signaling.

4. The method according to claim 1, wherein after sending the first process signaling to the first unit, the method further comprises:
   receiving a measurement report sent by user equipment, wherein the measurement report is used for indicating that a secondary cell to which the user equipment is accessed is in an abnormal state; and
   determining the second process signaling based on the measurement report.

5. The method according to claim 1, wherein after sending the first process signaling to the first unit, the method further comprises:
   receiving a reconfiguration process sent by a Long Term Evolution (LTE) system, wherein the reconfiguration process is used for indicating that configuration of a base station is in a to-be-modified state; and
   determining the second process signaling based on the reconfiguration process.

6. A non-transitory computer-readable storage medium storing computer programs, wherein the computer programs are configured to execute the method according to claim 1 at runtime.

7. An electronic device, comprising a memory and a processor, wherein the memory stores computer programs, and the processor is configured to run the computer programs so as to execute the method according to claim 1.

8. The method according to claim 1, wherein the first unit comprises a Centralized Unit (CU), and the second unit comprises a Distributed Unit (DU).

9. The method according to claim 1, wherein the second to-be-executed task comprises: incremental updating, process interruption, or process roll-back.

10. The method according to claim 3, wherein the interface message is an F1 interface message.

11. A process signaling receiving method performed by a first unit, comprising:
    receiving first process signaling sent by a second unit, wherein the first process signaling is used for instructing the first unit to execute a first to-be-executed task; and
    receiving, in a case where a first response message for the first process signaling is not sent to the second unit, second process signaling sent by the second unit, wherein the second process signaling is used for instructing the first unit to execute a second to-be-executed task, and a priority of the second to-be-executed task is higher than a priority of the first to-be-executed task,
    wherein after receiving, in the case where the first response message for the first process signaling is not sent to the second unit, the second process signaling sent by the second unit, the method further comprises: executing the second to-be-executed task to obtain a second response message; and sending the second response message to the second unit; and
    wherein after sending the second response message to the second unit, the method further comprises: executing the first to-be-executed task to obtain the first response message; and sending the first response message to the second unit.

12. The method according to claim 11, wherein the second process signaling is obtained by adding the preset information element in an interface message between the first unit and the second unit, and the interface message is an F1 interface message.

13. A non-transitory computer-readable storage medium storing computer programs, wherein the computer programs are configured to execute the method according to claim 11 at runtime.

14. An electronic device, comprising a memory and a processor, wherein the memory stores computer programs, and the processor is configured to run the computer programs so as to execute the method according to claim 11.

15. The method according to claim 11, wherein the first unit comprises a Centralized Unit (CU), and the second unit comprises a Distributed Unit (DU).

16. The method according to claim 11, wherein the second to-be-executed task comprises: incremental updating, process interruption, or process roll-back.

* * * * *